United States Patent [19]
Griesinger

[11] 4,219,738
[45] Aug. 26, 1980

[54] TURBINE INLET TEMPERATURE CONTROL APPARATUS AND METHOD

[75] Inventor: Robert E. Griesinger, Orinda, Calif.

[73] Assignee: Williams & Lane, Inc., San Leandro, Calif.

[21] Appl. No.: 906,020

[22] Filed: May 15, 1978

[51] Int. Cl.² .............................................. F1D1 15/10
[52] U.S. Cl. .................................... 290/40 R; 290/52; 60/39.28 R
[58] Field of Search ........................... 290/40, 4 R, 52; 60/39.28 R

[56] References Cited

U.S. PATENT DOCUMENTS

| | | | |
|---|---|---|---|
| 3,238,376 | 3/1966 | Ernst et al. | 290/4 R |
| 3,243,596 | 3/1966 | Loft | 290/40 R |
| 4,039,846 | 8/1977 | Vance | 290/40 R |

*Primary Examiner*—B. Dobeck
*Attorney, Agent, or Firm*—Warren, Chickering & Grunewald

[57] ABSTRACT

Apparatus and method for setting, controlling, and maintaining a given turbine inlet temperature in a gas-driven turbine and AC generator driven thereby having the generator output connected to a fixed frequency AC infinite bus. The method comprises providing electric signals proportional to generator rotational speed, turbine inlet temperature, and generator output power respectively. These three signals are processed and combined with two independent reference electric signals, representing preset desired values of rotational speed and turbine inlet temperature, to provide an output which, when applied to an electrically actuated fuel flow control means, will maintain a constant given turbine inlet temperature. The apparatus comprises means summing the turbine inlet temperature signal with a reference signal representing a preset desired temperature to provide a first output, means summing this first output with the rotational speed signal, a reference signal representing a preset desired rotational speed and the generator output power signal to provide a second output which, when connected to an electrically actuated fuel flow controller, will maintain a constant given turbine inlet temperature.

13 Claims, 2 Drawing Figures

TURBINE INLET TEMPERATURE CONTROL APPARATUS AND METHOD

BACKGROUND OF THE INVENTION

1. Field of Invention

The invention relates to control and governing systems for gas turbine engines used to drive AC generators.

2. Description of Prior Art

Gas turbine generator sets are commonly used to supplement AC power delivered by a commercial utility company. In the event of a utility company power failure, the turbine generator set will continue to supply constant frequency AC power to critical loads without interruption. Control systems commonly used are essentially feedback devices sensing generator speed and output power and adjusting turbine fuel flow. The common object of these controllers, when the generator is connected in parallel with the infinite bus of a utility company, is to keep the generator output powder from exceeding design limits. When the infinite bus disappears, through disconnection or utility power failure, the controller regulates generator speed so as to insure a constant frequency output. The inlet temperature of a turbine under the control of such a device fluctuates with variations in load and ambient temperature.

SUMMARY OF INVENTION

An object of the present invention is to maintain a constant turbine inlet temperature in a gas turbine engine driving an AC generator having its output connected to a fixed frequency AC infinite bus. The invention also limits the power delivered by the generator and, when the infinite bus disappears, maintains a constant generator rotational speed, thus assuring a fixed frequency output. The invention offers distinct advantages in situations where the turbine exhaust heat is utilized for steam generation, refrigeration processes, and other applications in which a constant thermal output is desirable. Since turbine exhaust temperature is directly proportional to inlet temperature, maintaining a constant turbine inlet temperature assures a constant thermal output.

In most gas turbine generator set applications only the rotational energy of the turbine driveshaft is utilized, thus wasting a significant portion of the turbine's total energy output. One primary reason that the thermal energy of the turbine exhaust is not put to use lies in the fact that exhaust temperature varies in proportion to the turbine load and ambient air temperature. The problems involved in utilizing this fluctuating thermal output can be overcome, but the expense often outweighs the resultant gain in efficiency. Many of the control systems which allow use of the fluctuating thermal output are still quite wasteful since they merely bypass excess output to the atmosphere.

The problems involved in utilizing the turbine's varying thermal output have restricted its use to a small number of non-critical applications. The present invention offers a significant increase in the overall efficiency of a gas turbine generator set and completely solves the problems posed by fluctuations in the thermal output. The present invention controls fuel flow to a gas turbine such that a constant thermal output is maintained regardless of fluctuations in ambient air temperature. Using the present invention, the dual restraints existing in an AC power generator application of constant speed and constant thermal output can be met simultaneously when an infinite bus (e.g., commercial utility lines) is available to meet the load demands which exceed the output power of the turbine driven generator. When the output power of the generator exceeds local load needs, the surplus power will be delivered to the infinite bus.

The present invention can be easily retrofitted on existing turbine generator sets, thus greatly increasing their usefulness and efficiency. In installations where the turbine exhaust was formerly vented directly to the atmosphere it can now be easily and inexpensively used in heating, air conditioning, and numerous other applications. Since the thermal output of the turbine is constant, the need for expensive thermal bypass devices and controls is eliminated. The present invention offers significant advantages over controllers of the prior art without forefeiting any of their desirable features.

An additional advantage offered by the invention is a lengthening of the service life of the turbine engine. It is well known that turbine blade life decreases dramatically with increases in inlet temperature. By maintaining a preset desired turbine inlet temperature, regardless of fluctuations in ambient air temperature and generator output power, the service life can be greatly extended. The invention finds its most appropriate application in situations where the primary concern is constant thermal output rather than maximum generator power output.

The invention utilizes commonly available electronic components and devices and can be easily substituted for presently available turbine controllers which do not offer turbine inlet temperature regulation. The invention does not require the installation of special fuel flow controllers and functions satisfactorily with electrically actuated controllers of the type currently used with the older non-temperature-regulating controllers.

The invention possesses other objects and features of advantage, some of which of the foregiong will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

DETAILED DESCRIPTION OF INVENTION

Figure 1:
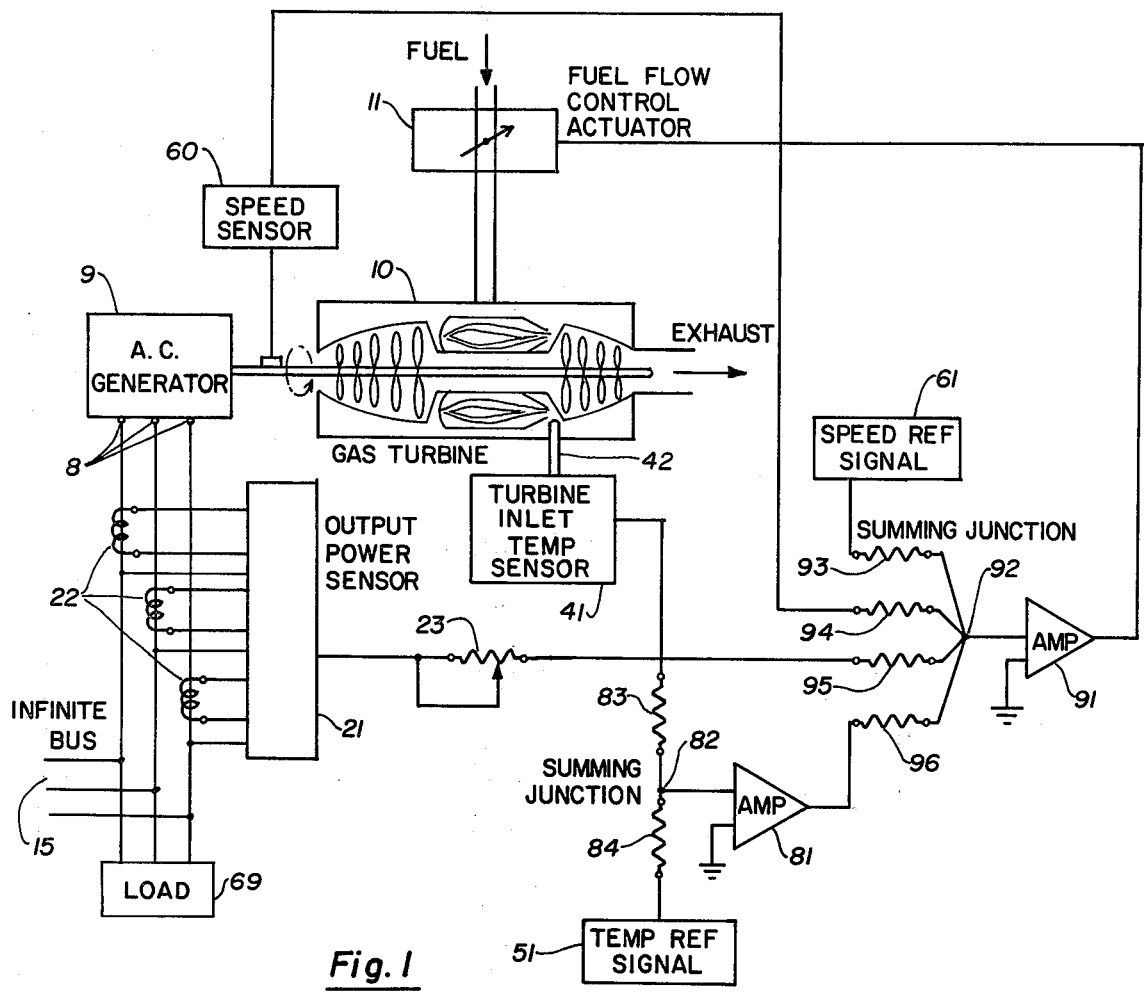
FIG. 1 is a simplified schematic diagram of controller connected to a turbine generator set.

The method and apparatus of the present invention is adapted for use with a gas-driven turbine 10 and an AC generator 9 driven thereby and having its output 8 connected to a fixed frequency infinite AC bus 15, as provided by the commercial power outlet, for supplying power to an electrical load 69, the method and apparatus of the present invention functioning to set control and maintain a constant turbine inlet temperature, see sensor 41-42.

The apparatus of the present invention comprises, briefly, a rotational speed sensor 60, a turbine inlet temperature sensor 41, a generator output power sensor 21, a speed reference signal 61, a temperature reference signal 51, and two summing amplifiers 81 and 91. The turbine inlet temperature sensor 41 uses thermocouple 42 to generate an electrical signal porportional to turbine inlet temperature. This turbine inlet temperature signal is fed to summing junction 82 through resistor 83. The temperature reference signal 51 supplies a constant signal, representing a preset desired value of turbine inlet temperature, to summing junction 82 through resistor 84. The resultant signal at summing junction 82 is the algebraic sum of the turbine inlet temperature signal and the temperature reference signal. This sum, proportional to the difference between actual and desired turbine inlet temperature, is amplified by amplifier 81 whose output is fed to summing junction 92 through resistor 96. The rotational speed sensor 60 produces a signal proportional to the rotational speed of the generator and feeds this signal to summing junction 92 through resistor 94. The output power sensor 21 produces a signal proportional to the generator output power and feeds this signal to summing junction 92 through resistor 95. The speed reference signal 61 produces a constant signal representing a preset desired rotational speed and feeds this signal to summing junction 92 through resistor 93. The resultant signal at summing junction 92 is the algebraic sum of the signals which are fed to it through resistors 93, 94, 95 and 96. The resultant signal at summing junction 92 is amplified by amplifier 91 whose output is used to drive an electrically actuated fuel flow controller 11.

The apparatus of the invention, as above noted, is connected to a gas turbine engine 10 used to drive an AC generator 9 whose output is connected in parallel with the infinite bus 15 of a utility company for purposes of delivering electrical power to the load 69. Before the output 8 of the turbine-driven AC generator 9 can be connected to the infinite bus 15 it must first be synchronized so that its output matches the voltage, frequency and phase characteristics of the infinite bus 15. Once synchronized, the connection can be made by closing generator circuit breaker 99. See FIG. 2. Once connected, the rotational speed of the turbine-driven AC generator 9 is locked to the frequency of the infinite bus.

Assuming that the signals fed to summing junctions 82 and 92 are all DC signals, the operation of the controller circuitry can be analyzed as follows. The control system has proportional and integral control: The proportional control is the output from amplifier 91 and the integral control is the fuel flow control actuator 11. A proper starting point in the analysis is to assume that when the generator is running at the desired speed, the input to the fuel flow controller 11 is zero and hence the output of amplifier 91 is zero. When the output of generator 9 is synchronized and connected to the infinite bus 15 the generator neither delivers or takes any power. This is so because the system is completely satisfied: The DC voltage output of speed reference signal 61 has been set to send some value of current through resistor 93 to the summing junction 92. The speed sensor 60, on the other hand, has reacted so as to remove precisely that value supplied through resistor 93 to the summing junction 92; it removes this through resistor 94. There is no net current into or out of the summing junction 92 (which is the input to the amplifier); the amplifier input voltage is zero. Likewise, the output voltage of amplifier 91 is zero and there is no input to the fuel flow controller 11. The fuel flow controller is at a steady position, one which gives a desired generator rotational speed at no load prior to paralleling the generator output with the infinite bus.

Power can only be delivered by forcing the control system to seek another point at which it is satisfied, a point corresponding to a greater fuel setting on the fuel flow controller 11. The signal produced by the output power sensor 21 is a negative voltage proportional to load. This output power signal is connected to the summing junction 92 through resistor 95 and potentiometer 23. This signal is zero volts at zero generator power output and so removes no current from the summing junction 92. The output power sensor 21 removes through potentiometer 23 a current proportional to generator output power, and will remove more current at a given power level if the resistance of potentiometer 23 is decreased in value. Potentiometer 23 is utilized to adjust the current removed at any given value of generator output power. The current supplied to the summing junction 92 can be increased by changing the output voltage of the speed reference signal 61 to a higher value. This would result in a positive output from amplifier 91 and an increased fuel setting on fuel flow controller 11, thus causing the generator 9 to deliver power. However, this is not done for the following reason: The output voltage of the speed reference signal 61 has previously been set so that if the utility infinite bus should fail, the generator will continue to operate at an unchanged frequency. It is desirable, therefore, not to tamper with the speed reference signal, but supply current in a different manner.

This current is supplied to summing junction 92 from amplifier 81. If the infinite bus should disappear (through utility failure or manual disconnect), the output of amplifier 81 must be disconnected from summing junction 92 so that the system can revert to the speed-regulating mode described above. The switching mechanisms which accomplish the disconnection of amplifier 81 from the summing junction 92 are thoroughly detailed in FIG. 2 and will be discussed later in the specification. When the amplifier 81 is connected to the summing junction 92 as shown in FIG. 1 the system must reach a new balance. The current provided by the speed reference signal 61 is unchanged and is just balanced by the current abstracted by the speed sensor 60. The speed reference signal remains at its original setting and the speed sensor output has not changed since the speed is locked to the frequency of the infinite bus. When current is injected to summing junction 92 by amplifier 81 the generator 9 will deliver a power proportional to this current by the following mechanism:

1. Generating by this as yet unbalanced current a voltage output from amplifier 91 which is connected to the fuel flow controller 11, 2. Causing the fuel flow controller to move towards an increased fuel position, and 3. Increasing the power delivered by the generator so as to, 4. Increase the negative voltage produced by the output power sensor to such a value that, 5. The output power sensor voltage now abstracts through potentiometer 23 precisely that value of current previously supplied prior to number 1 above, and 6. Leaving the output of amplifier 91 once again at zero volts, and 7. Giving a new (non-changing) increased fuel position of the fuel flow controller 11 with, 8. Increased generator output power.

The current required to be injected to summing junction 92 for any given power output depends upon how much current can be abstracted from that same power output by the output power sensor 21 through potentiometer 23. If potentiometer 23 presents a small series resistance, a large injected current is required; if potentiometer 23 presents a large series resistance, only a small injected current is required. If potentiometer 23 is removed entirely, however, the system can never rebalance itself by removing injected current and so analysis will show the fuel flow controller 11 continually moving to a greater and greater fuel position until the system overloads and fails. The output power sensor 21 and potentiometer 23 serve to achieve and maintain system re-balance with a newly injected current.

When the output of generator 9 is connected to the infinite bus, constant turbine inlet temperature is maintained by injecting through resistor 96 into summing junction 92 a current which is proportional to the difference between the signal produced by the turbine inlet temperature sensor 41 and the temperature reference signal 51, and by abstracting through resistor 95 from summing junction 92 an equal current which is proportional to the output power sensed by output power sensor 21. A system balance, i.e., the actual turbine inlet temperature is equal to the desired turbine inlet temperature, there is no voltage output from amplifier 91. Current abstracted through resistor 95, due to the action of output power sensor 21, is exactly balanced by current supplied through resistor 96 by amplifier 81. The output of amplifier 81 is proportional to the difference between temperature reference signal 51 and a signal produced by turbine inlet temperature sensor 41. At system balance the difference between these signals is such that amplifier 81 supplies through resistor 96 exactly the amount of current abstracted through resistor 95 by output power sensor 21, resulting in a zero output from amplifier 91.

The system is self-balancing and self-correcting in such a manner that constant turbine inlet temperature is automatically maintained. If, for example, turbine inlet temperature should momentarily decrease from the desired value at which system balance has been obtained, a momentary system imbalance will occur and a corrective action will rebalance the system in the following manner. The immediate result of a decrease in turbine inlet temperature is a reduction in the output signal from turbine inlet temperature sensor 41. This change from the previous balanced condition is sensed by amplifier 81, which will increase its output above the level maintained in the previous balanced condition. A greater current will therefore be supplied through resistor 96 than was previously supplied in the balanced condition, resulting in an output from amplifier 91. The output from amplifier 91 will cause the fuel flow control actuator 11 to supply more fuel to the turbine, with a resultant increase in power output. Increased power output sensed by output power sensor 21 will result in an increased abstraction of current through resistor 95 and a corrective action in the proper direction for the rebalancing of the system by equilization of the current supplied to summing junction 92, which will decrease the output of amplifier 91 to zero. This self-correcting system-rebalancing action will continue until the power has been properly increased so as to achieve the desired turbine inlet temperature value as represented by the temperature reference signal 51. The system will function in an analagous manner to decrease turbine inlet temperature should the turbine inlet temperature rise above the desired value. As can be seen from the foregoing discussion, the connection of output power sensor 21 to summing junction 92 plays a crucial role in regulating the turbine inlet temperature.

Figure 2:
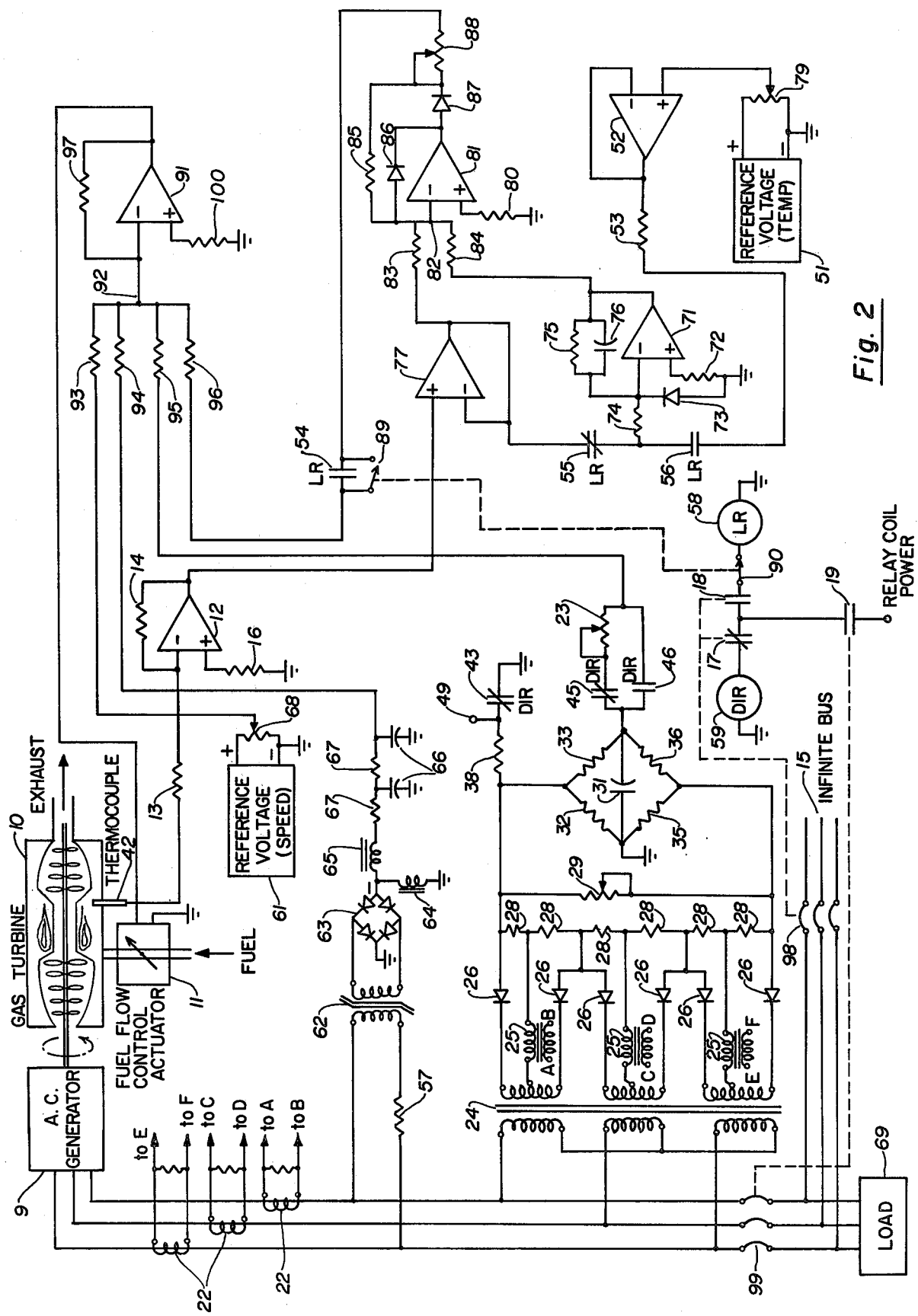
FIG. 2 is a more detailed schematic diagram showing the actual circuitry of the controller.

Examination of the more detailed schematic shown in FIG. 2 will aid in understanding the function of the circuits which make up the apparatus of the invention. The speed reference signal 61 is merely a regulated voltage supply whose output is made adjustable by potentiometer 68. The temperature reference signal 51 is similarly a regulated voltage supply made adjustable by the placing of potentiometer 79 across its output. Speed sensor 60 is seen to consist of resistor 57, transformer 62, rectifying diode bridge 63, filter chokes 64 and 65, filter capacitors 66 and resistors 67. The frequency of the generator output is directly proportional to rotational speed. The input of saturable core transformer 62 is connected to the output of generator 9 through current limiting resistor 57. Diode bridge 63 is connected so as to provide a negative DC output proportional to rotational speed. This pulsating DC output is smoothed and filtered by choke 65, capacitors 66 and resistors 67. The turbine inlet temperature sensor 41 consists of a thermocouple 42 whose DC output is amplified by amplifier 12. Generator output power sensor 21 consists essentially of current transformers 22 inductively coupled to each phase of the generator output, transformer 24, transformers 25, rectifying diodes 26, resistors 28, potentiometer 29, resistors 32, 33, 35, 36 and 38, and capacitor 31. The output power sensor monitors the three-phase output of the generator and produces a DC voltage proportional to the total KW output of the generator. The voltage across potentiometer 29 is a rectified DC voltage during load conditions. During no load conditions, there is no current flow and, therefore, no voltage induced in the current transformers 22. The voltage across 29 is zero. The potentiometer 29 functions as a gain control. This potentiometer is a voltage divider which feeds a variable part of the voltage across 29 to the bridge circuit formed by resistors 32, 33, 35 and 36.

The function of the output power sensor 21 depends upon whether the DIR (droop isochronous relay) 59 is energized. In the isochronous configuration contact 43 is open, contact 45 is open, and contact 46 is closed. When contact 43 opens, resistor 38 is effectively removed from the circuitry of the output power sensor 21. Resistors 32 and 35 are of equal value and resistors 33 and 36 are of equal value. Thus, in the isochronous configuration, the bridge circuit is balanced. In a balanced bridge, the voltage at the junction of resistors 32 and 33 is the same as the voltage at the junction of resistors 33 and 36. With the bridge balanced, the output power sensor gives no output and the engine speed is maintained by the speed sensor 60 and the speed reference signal 61. The isochronous configuration is used only when the generator output is not connected in parallel with the infinite bus. In the isochronous configuration the control system maintains constant generator speed.

When a turbine generator set having a controller as depicted in FIG. 2 is operating in the isochronous configuration it can be paralleled with similarly controlled generator sets by tying their grounds together and running a common connecting wire between junction 49 of each controller. In this configuration the bridges of the various controllers are all in balance and have a common reference. Potentiometer 29 is adjusted on each unit to give a certain voltage (e.g., 10 volts) when its associated generator is operating at 100 percent rated output power. At loads less than 100 percent the voltage across the potentiometer is proportionally smaller. Therefore, when the generator sets are paralleled, each set takes on its proportional share of the load. For example, assume that the capacity of unit 1 is 100 KW and unit 2, 50 KW. Unit 1 is in service and the load is 75 KW. The generator is at 75 percent of its capacity and the voltage across the potentiometer would be 7.5 volts using the 10-volt example above. Unit 2 is operating at no-load rated speed. When unit 2 is placed in service, the voltage across its potentiometer 29 is zero volts and the voltage across unit 1's potentiometer 29 is 7.5 volts. This creates an imbalance in both bridges which causes the output power sensor associated with unit 1 to decrease fuel while unit 2 increases fuel. The bridges remain unbalanced until the two voltages are equal and the load is shared proportionally. When balanced the voltage across the potentiometers of both units will be 5.0 volts. This means that the output of generator 1 is 50 KW and generator 2, 25 KW. The object of isochronous output power sensing is to provide a porportional division of load between units while maintaining a fixed frequency on an isolated bus. Each output power sensor compares the output of its associated generator with the output of other units in service and either increases or decreases fuel to the turbine to maintain its proportional share of the load. When the generator set is operating solo (i.e., not paralleled with other generator sets) and in the isochronous configuration, the output power sensor does not play an active roll in the control of the turbine. The use of a bridge to provide a proportional division of output power between paralleled isochronous units is well known and embodied in most of the older non-temperature-regulating turbine controllers.

Whenever single or paralleled generator sets are used on an infinite bus, the droop configuration is necessary to limit the load carried by the unit. With the infinite bus frequency fixed, operating in the isochronous mode will either overload the unit or cause shutdown on reverse current, depending on whether the unit speed reference 61 is above or below the frequency of the infinite bus. Since the machine frequency is fixed by the infinite bus, the speed reference signal can never be satisfied. The droop mode of operation utilizes a portion of the output power sensor 21 to oppose the action of the speed reference signal 61. As the speed reference signal attempts to maintain speed with load increase, the output power signal may be considered as reducing the speed reference signal, resulting in droop. Contacts 43, 45 and 46 of the droop isochronous relay are shown in the droop position in FIG. 2. In the droop position contact 43 is closed, thus grounding one end of resistor 38. Contact 45, in the droop configuration, is closed; hence, all current abstracted by the output power sensor passes through potentiometer 23. The aforementioned droop mode and its associated circuitry as shown in FIG. 2 are well known in the art and embodied in most currently available non-temperature-regulating turbine controllers.

When the generator 9 is delivering power to the load 69 and paralleled with the infinite bus 15, both the generator circuit breaker 99 and the infinite bus circuit breaker 98 are closed. When circuit breaker 99 is closed, its associated auxiliary contact 19 closes, contact 17 opens and 18 closes. The effect of the closing of circuit breakers 98 and 99 is that the droop isochronous relay 59 is de-energized, thus placing the turbine controller in the droop configuration discussed previously, and load relay 58 is energized, thus closing contact 54, opening contact 55, and closing contact 56. The energizing of the load relay places the temperature control portion of the circuitry in operation. It is the analysis of the turbine inlet temperature control circuitry which will next be addressed.

In FIG. 1 the temperature control circuitry in its simplified form consists of thermocouple 42, turbine inlet temperature sensor 41, temperature reference signal 51 and a summing amplifier formed by amplifier 81 and resistors 84 and 83 connected to junction 82. In FIG. 2 the temperature control circuitry is for the most part formed by amplifiers 12, 52, 71, 77 and 81 and the components immediately surrounding them. Amplifier 12 serves to amplify the low level DC output of thermocouple 42 which is connected to its inverting input through resistor 13. The gain of amplifier 12 is controlled by feedback resistor 14. Resistor 16 acts to stabilize the amplifier with respect to thermally induced offset voltage drift. Amplifier 52 is shown in the so-called potentiometric configuration with a gain of plus unity and theoretically has infinite input and zero output impedance. Amplifier 52 serves primarily as an output buffer for the temperature reference signal 51. Amplifier 77 is shown in the identical configuration and is used essentially to buffer the output of the thermocouple amplifier 12. The input of amplifier 71 may be connected by the load relay 58 and its associated contacts 55 and 56 either to the output of amplifier 77, which represents the turbine inlet temperature sensor signal, or to the output of amplifier 52 which represents the temperature reference signal. Amplifier 71 is configured as a quasi-integrator with an ultimate (eventual) gain of minus one and a time constant equal to the RC product of resistor 75 and capacitor 76. It should be clear that the output of amplifier 71, when subjected to a sudden change in input, cannot change immediately but most follow the well known exponential laws of resistor-capacitor charge and discharge with a controlling time constant determined by the value of resistor 75 and capacitor 76.

Finally, amplifier 81 is configured as an inverting summing amplifier. Amplifier 81 will take the positive output voltage from amplifier 77 (turbine inlet temperature signal), the negative output voltage from amplifier 71 (temperature reference signal), and give an output proportional to their algebraic sum. It is to be noted that the output of amplifier 81 can never be negative. This is prevented by diodes 86 and 87. If the junction of these two diodes should become negative, diode 87 is immediately disconnected from the output of amplifier 81, leaving a zero output, diode 86 conducts to drastically reduce the overall gain, and the junction of diodes 86 and 87 is held at a very low negative value irrespective of any input values to amplifier 81. Thus, the output of amplifier 81 can act only to increase turbine inlet temperature from its no-load value and never to decrease turbine inlet temperature from that value; a possible reverse power condition which might be caused by any other control component malfunction is therefore completely and positively averted.

The time delay in the response of amplifier 71 introduced by the RC combination of 75 and 76 prevents system shock when the load relay 58 is actuated. Actuation of relay 58 closes contact 56 and contact 54, thus causing an output from amplifier 81 which, when fed through resistor 96 to the summing junction 92, will cause the fuel flow control actuator 11 to move to a position which will maintain a constant turbine inlet temperature. This increased fuel flow, as compared to the fuel flow in the no-load situation, will cause the generator 9 to deliver power. The remainder of the components in the temperature control section of the apparatus, resistors 74 and 53 and diode 73, act to condition input signals to amplifier 71. Resistor 85 is a gain-controlling feedback resistor for amplifier 81 and potentiometer 88 is used to control the output. The summing junction 92 consisting of resistors 93, 94, 95 and 96 is essentially the same in FIG. 2 as it is in FIG. 1. Amplifier 91 is shown in FIG. 2 as an inverting summing amplifier with a feedback resistor 97. Resistors 72, 80 and 100, connected between ground and the non-inverting inputs of their respective amplifiers 71, 81 and 91, perform the well known function of reducing thermally induced offset voltage drift.

Mechanically interconnected contacts 89 and 90 function as an unloading switch. When 90 is opened, the load relay 58 drops outs. System shock is prevented by the simultaneous closing of 89. The closing of 89 keeps the output of amplifier 81 connected to summing junction 92. Gradual unloading occurs as the outputs of amplifiers 71 and 81 decay according to the RC time constant of resistor 75 and capacitor 76.

What is claimed is:

1. In a gas-driven turbine and AC generator driven thereby and having the generator output connected to a fixed frequency infinite AC bus for supplying power to an electrical load, apparatus for setting, controlling, and maintaining a constant turbine inlet temperature comprising:
   means sensing generator rotational speed and providing and electric signal proportional thereto;
   means providing a first reference electric signal;
   means sensing output power of said generator and providing an electric signal proportional thereto;
   means sensing turbine inlet temperature and providing an electric signal proportional thereto;
   means providing a second reference electric signal;
   electrically actuated means for controlling fuel flow to the turbine;
   means connected to and summing said turbine inlet temperature signal and said second reference signal and providing a first output signal;
   means connected to and summing said rotational speed signal and said first reference signal and said output power-sensing signal and said first output signal to provide a second output signal; and
   means connecting said second output signal to said fuel flow control means.

2. The apparatus of claim 1, wherein said signals are represented as DC voltages;
   said second reference signal representing a desired temperature; and
   said first-named summing means being configured for algebraic addition of said turbine inlet temperature signal and said second reference signal and providing at said first output:
   (a) a signal sufficient to balance at said second-named summing means the signal provided by said output power-sensing means when the actual turbine inlet temperature equals said desired temperature, and otherwise
   (b) a voltage proportional to the difference between said turbine inlet temperature and said desired temperature.

3. The apparatus of claim 2, said first reference signal representing a predetermined rotational speed of the generator;
   said second-named summing means being configured for algebraic addition of said rotational speed signal, said first reference signal, said output power signal and said first output, and providing at said second output:
   (a) a zero voltage when the generator output is connected to an infinite bus and actual turbine inlet temperature equals desired temperature,
   (b) a voltage proportional to the difference between the signal provided by said output power-sensing means and the signal provided at said first output,
   (c) a zero voltage when said infinite bus disappears and actual generator rotational speed equals said predetermined rotational speed, and
   (d) a voltage when said infinite bus disappears proportional to the difference between said generator rotational speed and said predetermined speed.

4. The apparatus of claim 3, said speed-sensing signal and said first reference signal being of opposite polarity, and said output power signal having the same polarity as said speed-sensing signal, whereby with said generator connected to said infinite bus thereby locking in said generator speed to the fixed frequency of said bus, the above-described signals co-function to limit the excursion of said output power.

5. The apparatus of claim 4, and
   means applying an adjustable portion of said output power signal to said second-named summing means to adjust the limit of the amplitude of said excursion.

6. The apparatus of claim 5, said first-named summing means including an amplifier having an output connected to said second-named summing means.

7. The apparatus of claim 6, said second-named summing means including an amplifier having an output connected to said fuel flow means.

8. The apparatus of claim 6, and
   means providing a time delay in the response of said amplifier to rapid signal changes in its input.

9. The apparatus of claim 6, and
   means clamping said amplifier output, thereby limiting the function of said output only to increase turbine inlet temperature to a value above the turbine inlet temperature existing under the condition of no load, thus preventing a reverse power condition incident to a control component malfunction.

10. The apparatus of claim 1, and
    means disabling said output power signal in response to said disconnection or disappearance of said infinite bus when said generator output is the sole means for supplying power to said electrical load.

11. The method of maintaining a constant turbine inlet temperature for a gas-driven turbine having electrically actuated means for controlling fuel flow thereto and being connected to drive an AC generator having its output connected to a fixed frequency infinite AC bus for supplying power to an electrical load comprising:
    providing a first electric signal as a function of generator rotational speed, a second electric signal providing a reference, a third electric signal as a function of the power output of said generator, a fourth electric signal as a function of turbine inlet temperature, a fifth electric signal providing a reference;

summing at a first summing junction said fourth and fifth signals to provide a first output signal;

summing at a second summing junction said first, second, third and first output signals to provide a second output signal; and controlling said fuel flow means as a function of said second output signal.

12. The method of claim 11 wherein said signals are DC voltages and said second reference signal represents a desired temperature; and algebraically summing said fourth electric signal and said second reference signal to provide at said first output:
  (a) a signal sufficient to balance at said second summing junction said third electric signal when the actual turbine inlet temperature equals said desired temperature, and otherwise
  (b) a voltage proportional to the difference between said turbine inlet temperature and said desired temperature.

13. The method of claim 12 wherein said first reference signal represents a predetermined rotational speed of said generator; and algebraically summing said first electric signal, said first reference signal, said third electric signal and said first output to provide at said second output:
  (a) a zero voltage when the generator output is connected to an infinite bus and actual turbine inlet temperature equals desired temperature,
  (b) a voltage proportional to the difference between said third electric signal and the signal of said first output,
  (c) a zero voltage when said infinite bus disappears and actual generator rotational speed equals said predetermined rotational speed, and
  (d) a voltage when said infinite bus disappears proportional to the difference between said generator rotational speed and said predetermined speed.

* * * * *

UNITED STATES PATENT AND TRADEMARK OFFICE
CERTIFICATE OF CORRECTION

PATENT NO. : 4,219,738
DATED : August 26, 1980
INVENTOR(S) : Robert E. Griesinger It is certified that error appears in the above-identified patent and that said Letters Patent are hereby corrected as shown below:

Col. 1, line 21, delete "powder" and insert ---power---;

line 27, after "ambient" and before "temperature"

insert ---air---;

Col. 5, line 25, after "sensor 21" and before "system"

delete "A" and insert ---At---; and lines 64-65, after "power" and before "has"

insert ---output---.

Signed and Sealed this

Ninth Day of December 1980

[SEAL]

Attest:

SIDNEY A. DIAMOND

Attesting Officer    Commissioner of Patents and Trademarks